(12) United States Patent
Branson, III et al.

(10) Patent No.: US 11,358,106 B2
(45) Date of Patent: Jun. 14, 2022

(54) STAND MIXER WITH MECHANISM TO LIFT HEAD

(71) Applicant: Hamilton Beach Brands, Inc., Glen Allen, VA (US)

(72) Inventors: Benjamin H Branson, III, Mechanicsville, VA (US); Koen Aidan Ambrose, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 619 days.

(21) Appl. No.: 16/258,130

(22) Filed: Jan. 25, 2019

(65) Prior Publication Data

US 2020/0238236 A1     Jul. 30, 2020

(51) Int. Cl.
| | |
|---|---|
| *B01F 27/806* | (2022.01) |
| *B01F 27/213* | (2022.01) |
| *B01F 35/32* | (2022.01) |
| *A47J 43/07* | (2006.01) |
| *B01F 35/31* | (2022.01) |
| *B01F 35/33* | (2022.01) |
| *A47J 43/044* | (2006.01) |
| *A47J 43/08* | (2006.01) |

(52) U.S. Cl.
CPC ......... *B01F 27/806* (2022.01); *A47J 43/0705* (2013.01); *A47J 43/082* (2013.01); *B01F 27/213* (2022.01); *B01F 35/323* (2022.01); *A47J 2043/04472* (2013.01); *B01F 35/31* (2022.01); *B01F 35/3204* (2022.01); *B01F 35/3214* (2022.01); *B01F 35/33* (2022.01)

(58) Field of Classification Search
CPC .................. B01F 7/161; B01F 7/00725; B01F 15/00448; B01F 15/00538; B01F 2015/00603; B01F 2015/00623; B01F 7/30; B01F 7/1605; B01F 27/806; B01F 27/213; B01F 35/323; B01F 35/31; B01F 35/3204; B01F 35/3214; B01F 35/33; B01F 27/95; A47J 43/044; A47J 43/0705; A47J 43/0711; A47J 2043/04472; A47J 43/082
USPC ........................................................ 366/286
See application file for complete search history.

(56) References Cited

U.S. PATENT DOCUMENTS

| | | | |
|---|---|---|---|
| 1,761,237 A | 6/1930 | Schiff | |
| 2,026,240 A * | 12/1935 | Luxmore | B01F 7/161 366/206 |
| 2,137,547 A | 11/1938 | Snow | |
| 2,701,698 A * | 2/1955 | Holstein | A47J 43/044 248/669 |

(Continued)

FOREIGN PATENT DOCUMENTS

FR     3083680 A1 *   1/2020          A47J 43/044

*Primary Examiner* — Charles Cooley
(74) *Attorney, Agent, or Firm* — Alexander D. Raring

(57) ABSTRACT

A stand mixer includes: a lower assembly comprising a base and a lower support arm extending upwardly from the base; an upper assembly comprising a generally horizontal head positioned above the base and an upper support arm extending downwardly from the head, the lower and upper support arm assemblies forming a generally vertical support arm, the head configured to provide a mounting location for a beater; and a head-raising mechanism that moves the head relative to the base between raised and lowered positions, the head remaining generally horizontal in the raised position.

19 Claims, 10 Drawing Sheets

(56) References Cited

U.S. PATENT DOCUMENTS

| | | | |
|---|---|---|---|
| 4,042,221 A * | 8/1977 | Myers | B01F 7/161 |
| | | | 366/146 |
| 4,358,298 A * | 11/1982 | Ratcliff | E21B 21/067 |
| | | | 366/137 |
| 4,898,474 A * | 2/1990 | Lipson | B01F 7/161 |
| | | | 366/199 |
| 5,533,805 A * | 7/1996 | Mandel | A47J 36/165 |
| | | | 366/197 |
| 5,836,687 A * | 11/1998 | Khalid | A21C 1/02 |
| | | | 366/207 |
| D448,966 S | 10/2001 | Hsieh | |
| 6,367,963 B2 | 4/2002 | Sanpei et al. | |
| 6,410,068 B2 | 6/2002 | Goldston | |
| 6,470,793 B1 | 10/2002 | Vogt | |
| 6,668,704 B1 | 12/2003 | Lassota | |
| 7,014,354 B2 | 3/2006 | Donthnier et al. | |
| 7,175,338 B2 | 2/2007 | Hooper et al. | |
| 7,950,843 B2 | 5/2011 | Blackburn et al. | |
| 8,251,567 B2 | 8/2012 | Brunswick et al. | |
| 8,438,968 B2 | 5/2013 | Warner | |
| 2005/0058018 A1 | 3/2005 | Hooper et al. | |
| 2008/0291777 A1 | 11/2008 | Schnipke et al. | |
| 2020/0238236 A1* | 7/2020 | Branson, III | B01F 7/161 |

* cited by examiner

STAND MIXER WITH MECHANISM TO LIFT HEAD

FIELD OF THE INVENTION

The present application is directed generally to mixers, and more particularly to stand mixers.

BACKGROUND

Stand mixers are popular home appliances used for multiple tasks in combining ingredients, such as mixing, creaming, blending, and the like. Stand mixers typically include a base that supports a bowl, an upright support arm that extends upwardly from the base, and a cantilevered "head" that extends horizontally from the upright support on which beaters are mounted. The beaters extend downwardly from the arm into the bowl for use.

Stand mixers ordinarily employ one of two basic techniques to enable the bowl to be inserted or removed from its position beneath the beaters: tilting heads or bowl lifts. Bowl lifts are used on stand mixer models for which the head of the mixer is in a fixed position. Bowl lifts generally comprise mechanisms that employ rails, gears, linkages or the like mounted on the support arm. A foundation that supports the bowl from underneath or grips its sides is coupled to the mechanism. A drive mechanism drives the foundation, and therefore the bowl, up and down relative to the base. Exemplary bowl lifts are described in, for example, U.S. Pat. Nos. 1,761,237; 8,251,567; 7,950,843; and 7,014,354; U.S. Patent Publication No. 2008/0291777, and co-pending and co-assigned U.S. patent application Ser. No. 15/952,882, filed Apr. 13, 2018, each of which is hereby incorporated herein by reference in its entirety. However, these systems often present cleaning issues (for example, rails and gears may be particularly difficult to clean) and may be aesthetically unpleasing to some consumers.

Stand mixers with tilting heads typically locate the motor in the head and use lighter components and less powerful motors. The head tilts via a pivoting mechanism to move the beaters into and out of position. An exemplary tilting head stand mixer is Hamilton Beach Model No. 63325, available from Hamilton Beach Brands (Richmond, Va.). However, the tilt mechanism of a tilt head mixer can undesirably introduce a loose point for vibration during operation of the mixer.

In view of the foregoing, it may be desirable to provide additional configurations for stand mixers.

SUMMARY

As a first aspect, embodiments of the invention are directed to a stand mixer. The stand mixer comprises: a lower assembly comprising a base and a lower support arm extending upwardly from the base; an upper assembly comprising a generally horizontal head positioned above the base and an upper support arm extending downwardly from the head, the lower and upper support arm assemblies forming a generally vertical support arm, the head configured to provide a mounting location for a beater; and a head-raising mechanism that moves the head relative to the base between raised and lowered positions, the head remaining generally horizontal in the raised position.

As a second aspect, embodiments of the invention are directed to a stand mixer, comprising: a lower assembly comprising a base, a lower support arm extending upwardly from the base, and a motor; an upper assembly comprising a generally horizontal head positioned above the base and an upper support arm extending downwardly from the head, the lower and upper support arm assemblies forming a generally vertical support arm, the head configured to provide a mounting location for a beater; a drive train mounted in the upper assembly operatively connected to the beater; a head-raising mechanism that moves the head relative to the base between raised and lowered positions, the head remaining generally horizontal in the raised position; and a coupling mechanism that couples the drive train to the motor in the lowered position and decouples the drive train from the motor in the raised position.

As a third aspect, embodiments of the invention are directed to a stand mixer, comprising: a lower assembly comprising a base, a lower support arm extending upwardly from the base, and a motor; an upper assembly comprising a generally horizontal head positioned above the base and an upper support arm extending downwardly from the head, the lower and upper support arm assemblies forming a generally vertical support arm, the head configured to provide a mounting location for a beater; a drive train mounted in the upper assembly operatively connected to the beater; a head-raising mechanism that moves the head relative to the base between raised and lowered positions, the head remaining generally horizontal in the raised position, the head-raising mechanism comprising a cam pivotally mounted to the upper support arm assembly that bears against the lower support arm assembly; and a coupling mechanism that couples the drive train to the motor in the lowered position and decouples the drive train from the motor in the raised position.

DETAILED DESCRIPTION

Figure 1:
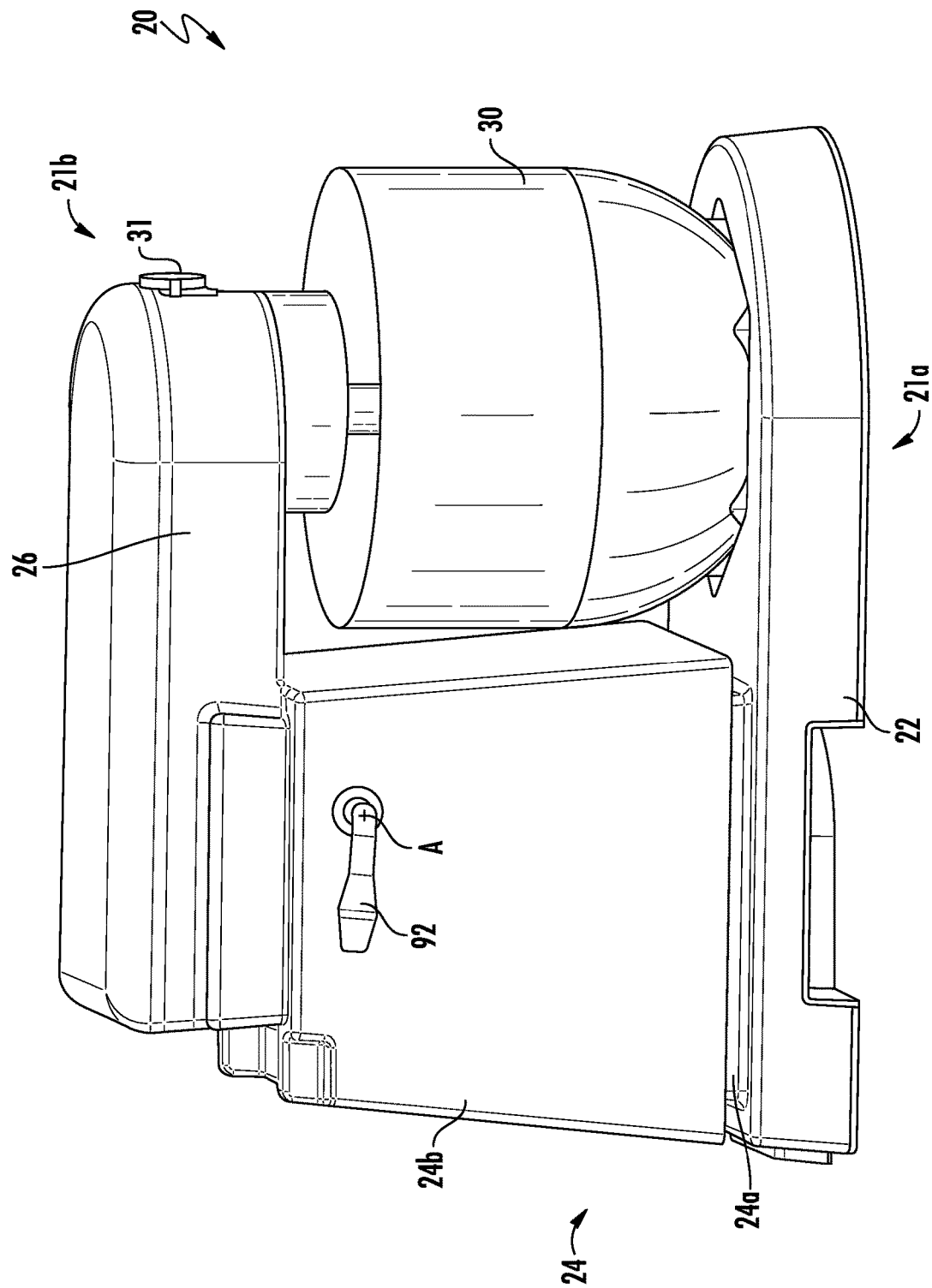
FIG. 1 is a side perspective view of a stand mixer according to embodiments of the invention, with the head of the mixer shown in its lowered position.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Referring now to the figures, a stand mixer according to embodiments of the invention is shown in FIGS. 1-12 and designated broadly at 20. The stand mixer 20 can be divided into a lower assembly 21a and an upper assembly 21b that reciprocates vertically relative to the lower assembly 21a via a head-raising mechanism 78. The lower assembly 21a includes a base 22 that rests on an underlying surface, such as a kitchen counter, and a lower support arm assembly 24a that extends upwardly from the base 22. The upper assembly 21b includes an upper support arm assembly 24b and a head 26 that extends generally horizontally and forwardly from the upper end of the upper support arm assembly 24b. Together, the lower and upper support arm assemblies form an overall support arm 24. (As used herein, the "forward" or "front" direction is defined by a horizontal vector extending from the support arm 24 toward the opposite end of the base 22. The "rear" direction is opposite the forward direction).

Figure 3:
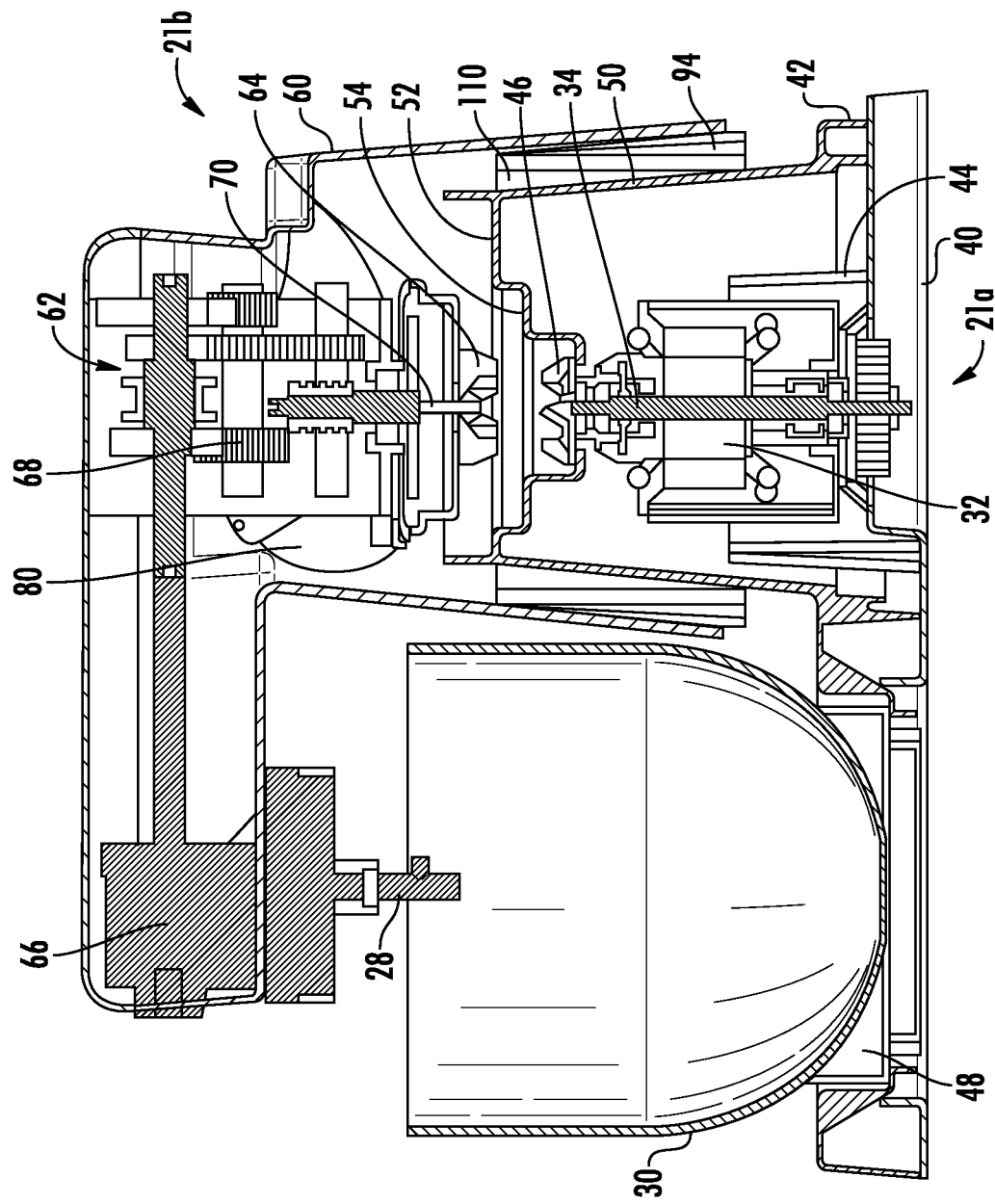
FIG. 3 is a side section view of the stand mixer of FIG. 1, with the head in its raised position.
Figure 4:
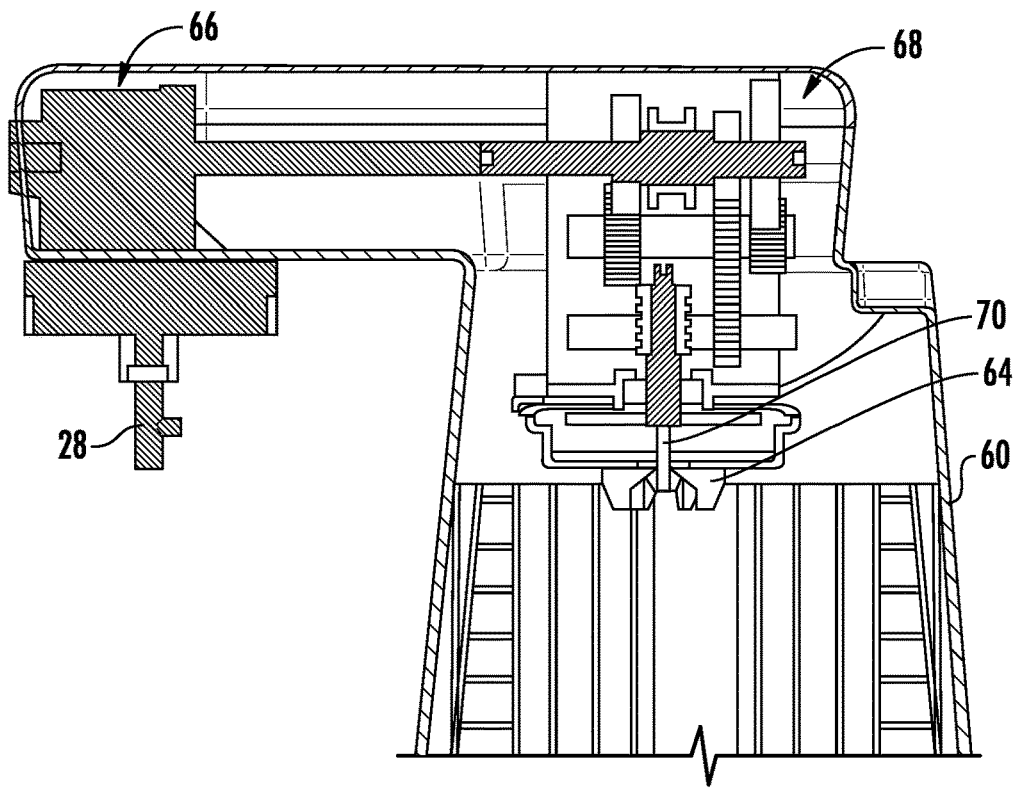
FIG. 4 is an enlarged partial section view of the stand mixer of FIG. 1 with the head in its raised position.
Figure 5:
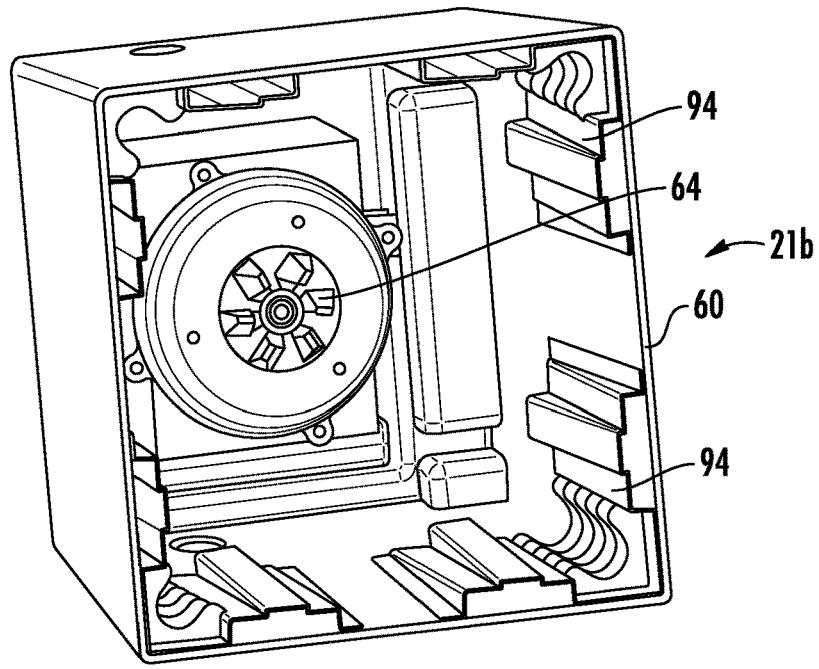
FIG. 5 is a bottom partial perspective view of the head of the stand mixer of FIG. 1.
Figure 6:
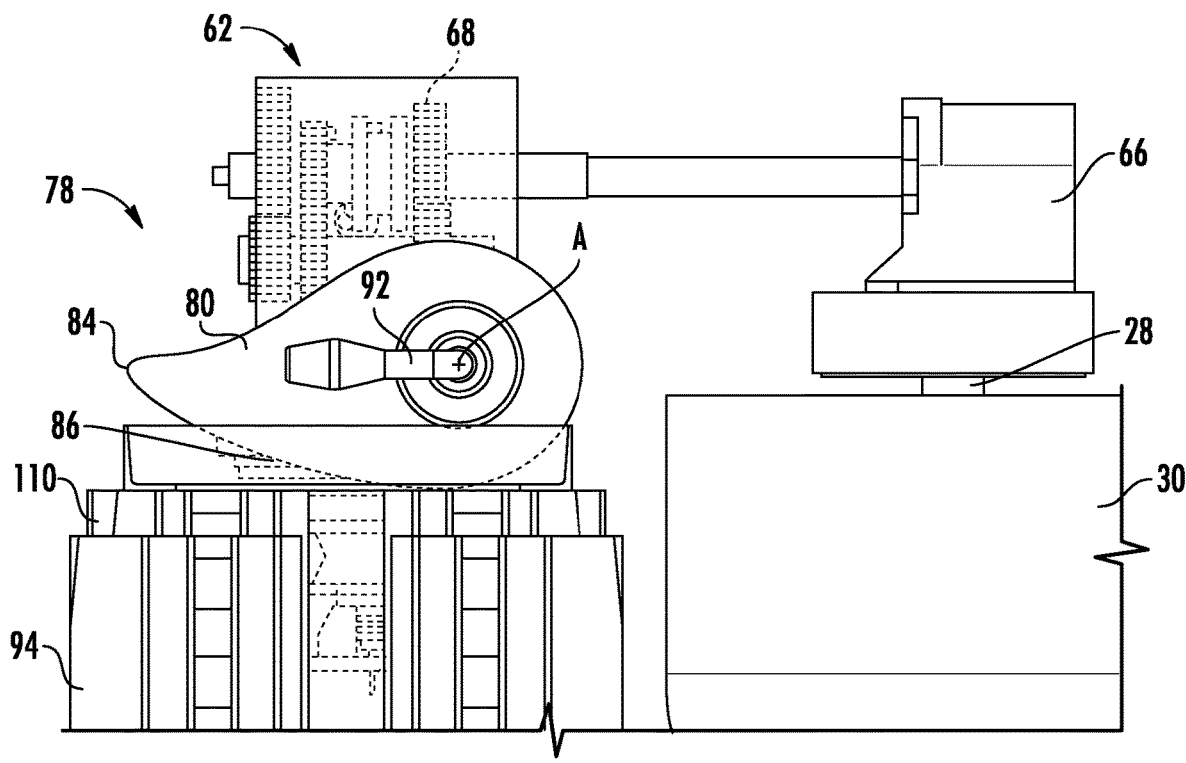
FIG. 6 is a partial internal side view of the stand mixer of FIG. 1, with the head in its lowered position.

Referring now to FIG. 3, it can be seen that the lower assembly 21a includes a foundation 40 and a lower housing 42. The foundation 40 includes a sleeve 44 that extends upwardly from its rear portion. A motor 32 is mounted in the sleeve 44. A shaft 34 extends upwardly through and above the motor 32. At its upper end, the shaft 34 includes a lower clutch 46 with upwardly-extending teeth.

The lower housing 42 is mounted onto and above the foundation 40 and covers the lower assembly 21a of the mixer 20. The lower housing 42 includes a sloped circular depression 48 at its front end in which the bowl 30 resides. At its rear end, the housing 42 has a tower 50 that surrounds the sleeve 44 and the motor 32; the tower 50 is has a generally square cross-section and narrows slightly with increasing height. The tower 50 has a ceiling 52 with a generally centered two-step circular recess 54; the lower clutch 46 is positioned above the lower section of the recess 54. The ceiling 52 includes a bearing track 56 on each side of the recess 54 that extends longitudinally (i.e., "front-to-back") along much of the length of the ceiling 52 (see, e.g., FIGS. 7 and 8).

Figure 7:
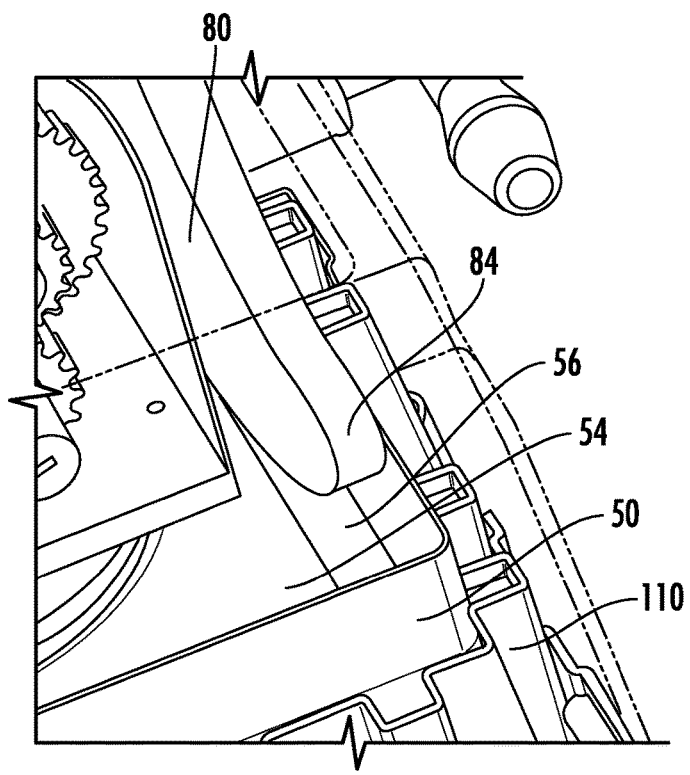
FIG. 7 is an enlarged partial internal perspective view of the cams and motor of the stand mixer of FIG. 1, with the head in its lowered position.
Figure 13:
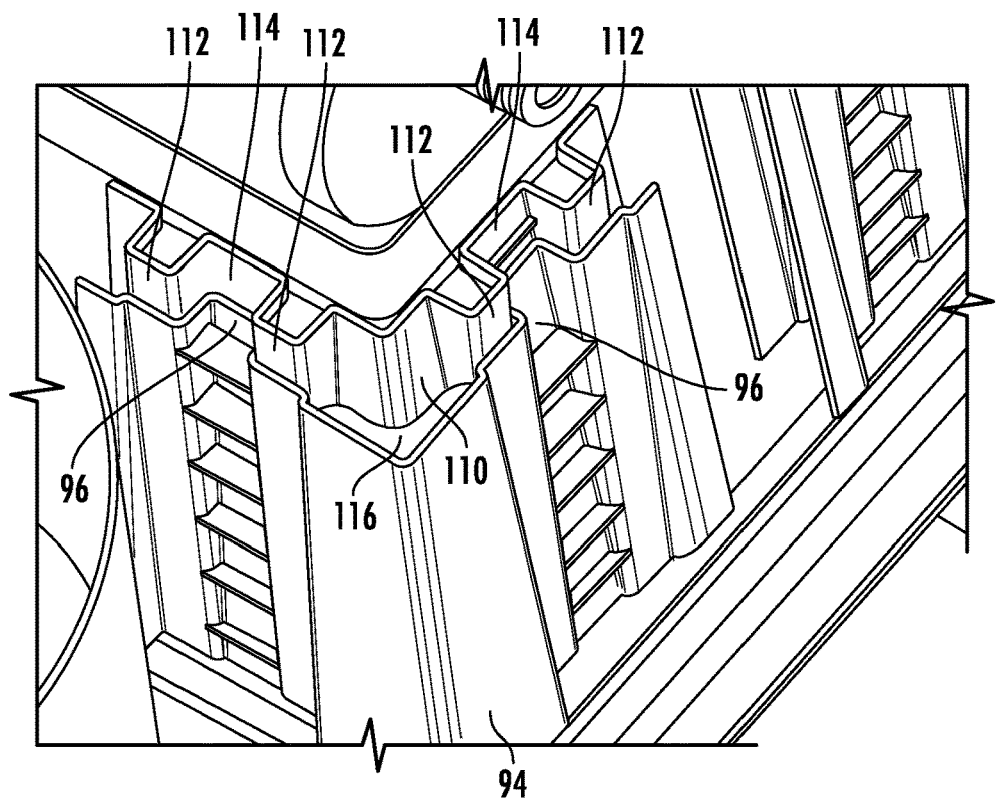
FIG. 13 is a top partial perspective view of the guides of the lower and upper assemblies.

Referring now to FIGS. 7 and 13, four guides 110 are fixedly mounted on the corners of the tower 50. On each side, each slide 110 includes two vertical columns 112 that sandwich a vertical gap 114.

Referring again to FIG. 3, an upper housing 60 covers the upper assembly 21b. Within its interior, the upper housing 60 houses a drive train 62 that extends between, at one end, an upper clutch 64 that mates with the lower clutch 46 and, at the other end, a pair of beaters 28 mounted near the forward end of the upper housing 60 (the handle of one of the beaters 28 is shown in FIG. 3). The drive train includes a planetary gear arrangement 66 within the head 26 above the bowl 30 and a gear box 68. The planetary gear arrangement 66 (see FIG. 9 also) enables the beaters 28 to thoroughly mix ingredients within the bowl 30 mounted on the base 22 without scraping the sides or the bottom of the bowl 30. In such an arrangement, each of the beaters 28 rotates about an axis defined by its shaft, plus the pair of beaters 28 revolves together about an axis centered over the bowl 30 (described in detail below). The planetary gear arrangement 66 can be any of those known to those of skill in this art (see, for example, U.S. Pat. No. 5,934,802) and need not be described in detail herein.

A shaft 70 extends downwardly from the gear box 68 to the upper clutch 64. The gear box 68, which converts rotary motion of the upper clutch 64 about a vertical axis defined by the shaft 70 into rotary motion about a horizontal axis in the head 26, may also be of conventional construction.

Figure 8:
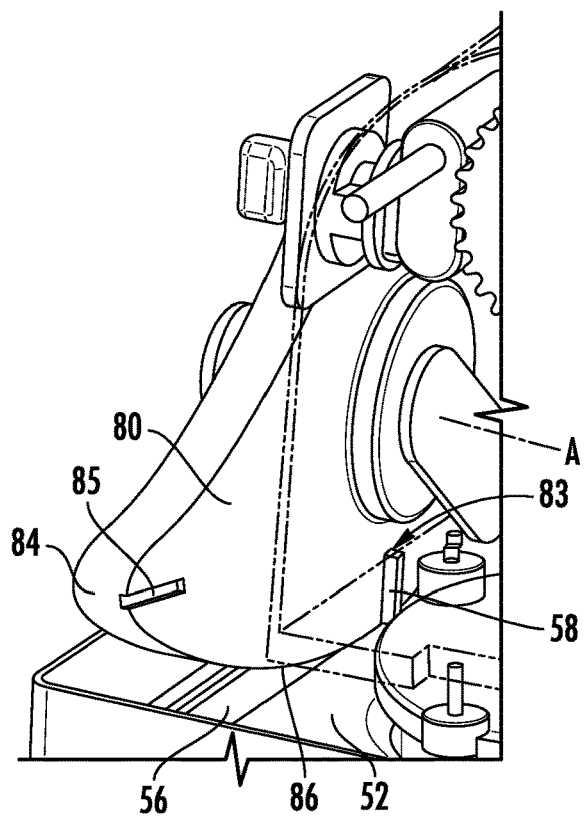
FIG. 8 is a perspective view of one of the cams of FIG. 7 as the head is in its lowered position.

As can be seen in FIG. 6-11, the head-raising mechanism 78 includes a cam 80 that is pivotally mounted to each side wall 82 of the upper housing 60. Each of the cams 80 is generally wing-shaped, with a tip 84 and an arcuate lower bearing surface 86. As shown in FIGS. 7 and 8, the bearing surface 86 of each of the cams 80 is positioned to reside within one of the bearing tracks 56 in the ceiling 54 of the lower housing 40.

Figure 9:
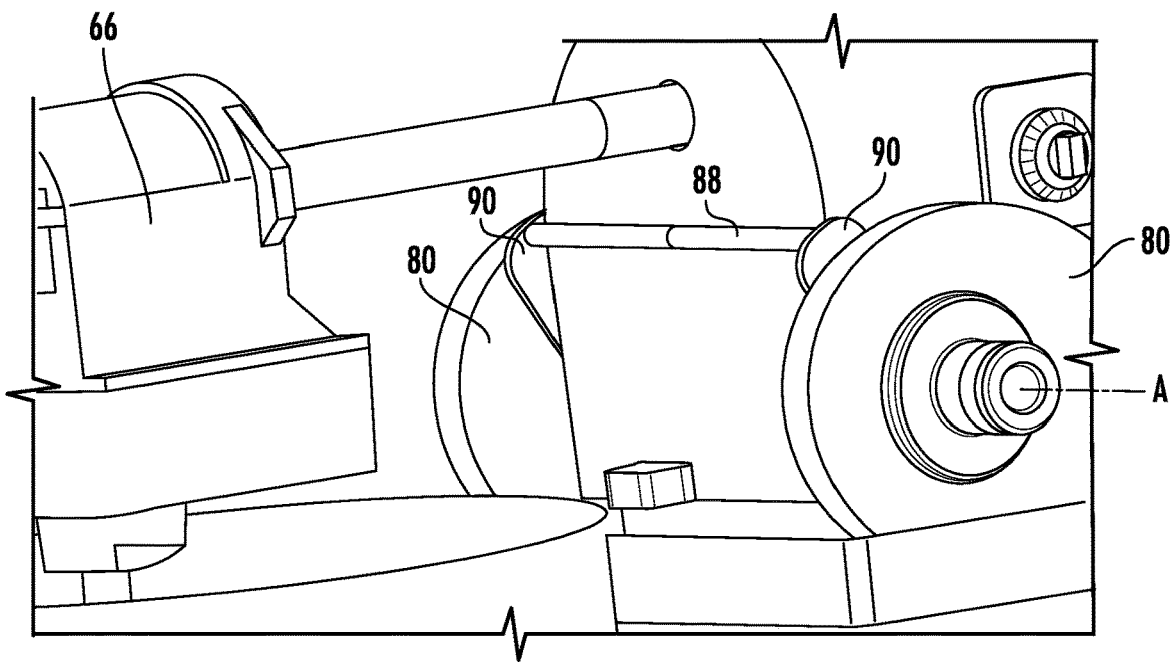
FIG. 9 is a partial internal side view of the stand mixer of FIG. 1 showing the cam as the head is in its raised position.

Referring now to FIG. 9, the cams 80 on each side of the upper housing 60 are connected with each other via a connecting rod 88 that is attached at each end to a drive member 90 fixed to a respective cam 80. The connecting rod 88 causes both cams 80 to move in concert. On one side, a handle 92 is fixed to the adjacent cam 80 and extends outside of the upper housing 60 for manipulation by a user.

Figure 11:
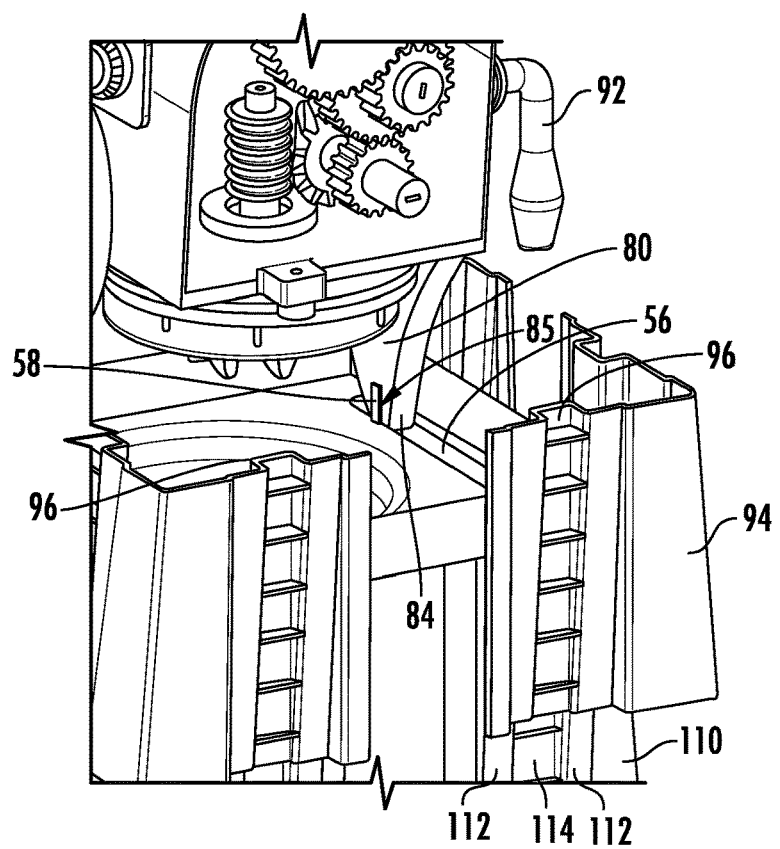
FIG. 11 is a partial internal perspective view of the stand mixer of FIG. 1 showing the interaction of the cam and the bearing track with the head in its lowered position.
Figure 12:
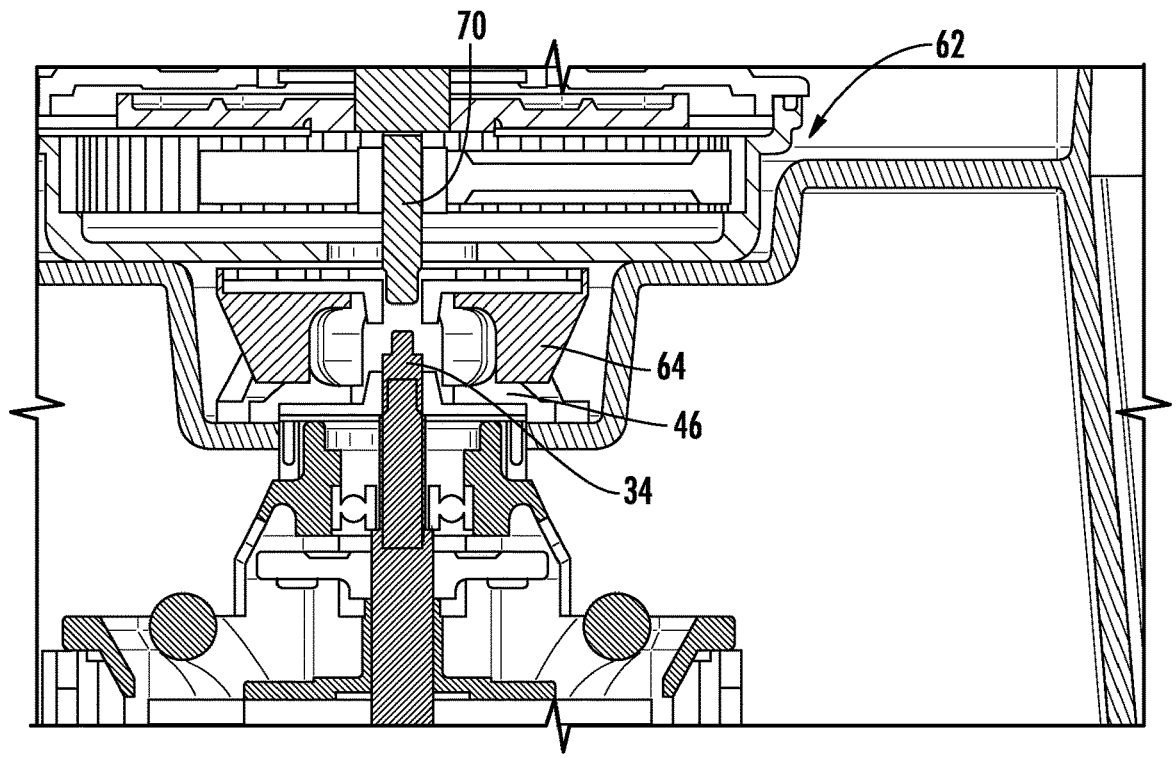
FIG. 12 is a greatly enlarged internal side view of the clutch of the stand mixer of FIG. 1 showing the engagement of the clutch when the head is in its lowered position.

As can also be seen in FIGS. 11-13, a guide 94 is mounted in each interior corner of the upper housing 60. Each guide 94 includes two projections 96, each of which is sized to fit within a mating gap 114 in an adjacent slide 110. Each guide 94 also includes an L-shaped spacer 116 that extends on either side of the corner of the adjacent mating guide 110. Thus, the guides 94, 110 are able to slide vertically relative to each other, thereby enabling the upper assembly 21b, including the head 26 and beaters 28, to ascend and descend relative to the lower assembly 21a.

A dial 31 (FIG. 1) that regulates the speed of the beaters 28 is mounted on front of the head 26. The dial 31 is electrically connected with the motor 32 in a conventional manner. A power cord (not shown) is also electrically connected with the motor 32.

As noted above, the mixer 20 can be moved between (a) a raised position (FIGS. 2, 3, 10 and 11), in which the upper assembly 21b moves relative to the lower assembly 21a so that head 26 and beaters 28 are raised relative to the bowl 30, thereby enabling the bowl 30 to be removed from the base 22 and/or the beaters 28 to be installed on or removed from the head 26, and (b) a lowered position (FIGS. 1, 6-9 and 12), in which the upper assembly 21b is lowered relative to the lower assembly 21a so that the beaters 28 are lowered into the bowl 30 for mixing. In the lowered position, the upper assembly 21b descends sufficiently that the upper clutch 64 engages the lower clutch 46 (see FIG. 12). As such, when the motor 32 is energized, it turns the shaft 34. Because the lower clutch 46 is engaged with the upper clutch 64, rotation of the shaft 34 also rotates the shaft 70, which through the drive train 62 causes the beaters 28 to rotate. In some embodiments, in the raised position the head 26 is between about 1.5 and 3.5 inches higher above the base 22 than in the lowered position.

The mixer 20 can be moved to the lowered position described immediately above by moving the handle 92 to the horizontal position shown in FIG. 1. In this orientation, the cams 80 are oriented about the axis of rotation A such that their lower bearing surfaces 86 are in the bearing tracks 56. As described above, in this lowered position, the upper clutch 64 is lowered to an elevation in which it engages with the lower clutch 46, enabling the motor 32 to power the beaters 28 through the drive train 62.

In the illustrated embodiment, a flexible finger 58 (FIG. 8) extends upwardly from the ceiling 52 of the tower 50 adjacent the bearing track 56. The finger 58 is positioned to fit within a slot 83 in the inner surface of the cam 80. When the finger 58 is received in the slot 83, the cam 80 is maintained in position (and, in turn the upper assembly 21b is maintained in the lowered position).

Figure 2:
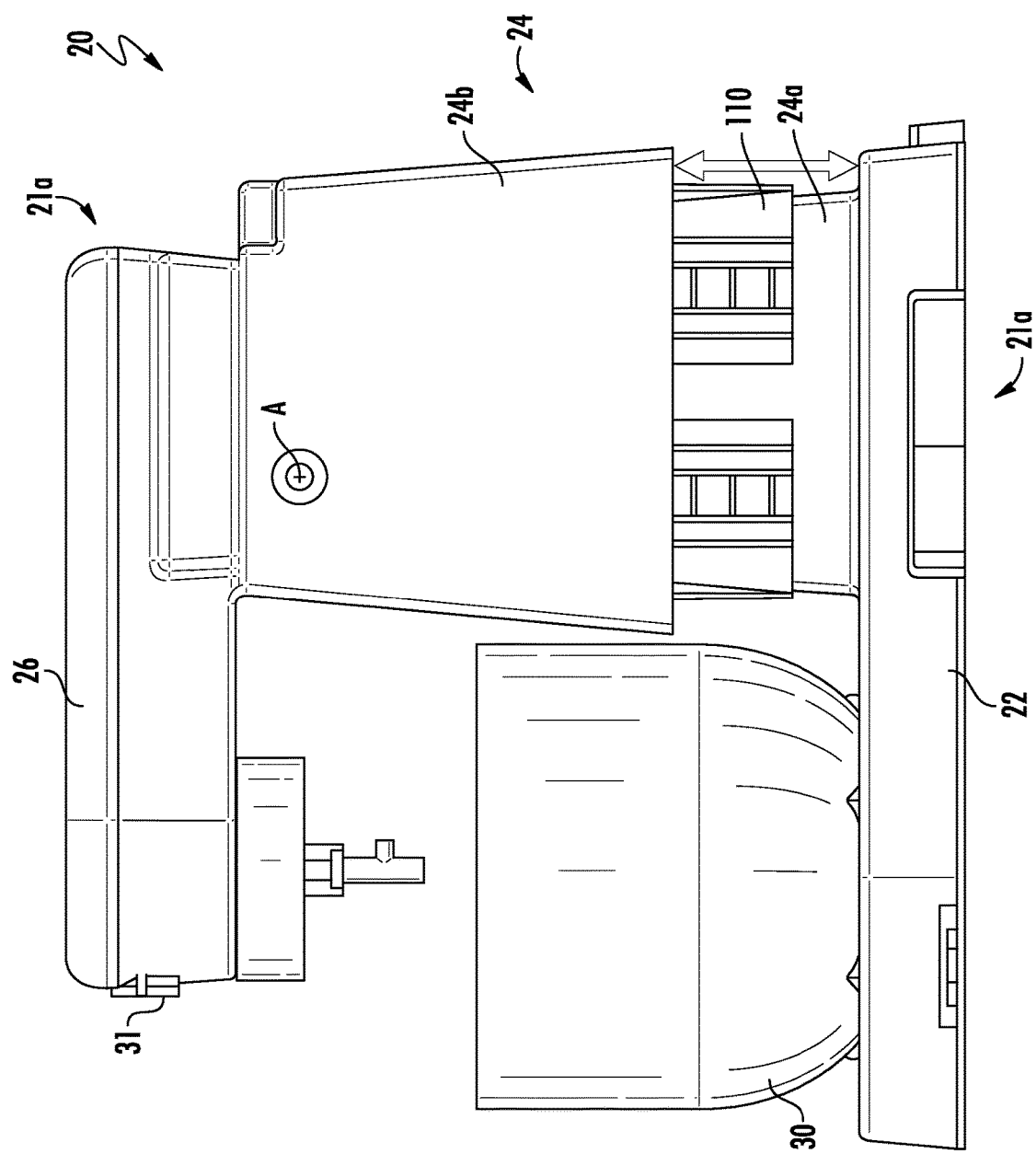
FIG. 2 is a side view of the stand mixer of FIG. 1, with the head of the mixer shown in its raised position.

To raise the upper assembly 21b (including the head 26) to the raised position shown in FIG. 2, the user simply rotates the handle 92 about the axis A (counterclockwise from the vantage point of FIG. 1). This action causes the cams 80 to rotate about the axis A so that the tip 84 of the cam moves downwardly and forwardly. Typically, the finger 58 is flexible enough that it deflects easily out of the way when the cam 80 starts to rotate. The bearing surface 86 of the cam 80 continues to contact the bearing track 58, but the shape of the cam 80 causes the upper housing 60 and all components attached thereto (including the head 26 and the beaters 28) to rise. The presence of the connecting rod 88 causes both cams 80 to rotate simultaneously, thereby providing stability to the head 26 as it rises.

Also, as the upper assembly 21b rises, the guides 94 mounted thereon slide upwardly relative to the stationary guides 110. The interaction of the guides 94, 110 assists the upper assembly 21b to rise straight upwardly relative to the lower assembly 21a, which can ensure that the upper clutch 64 remains positioned correctly above the lower clutch 46 for subsequent re-engagement upon lowering of the upper assembly 21b.

Raising of the upper assembly 21b ceases when the cam 80 rotates sufficiently that the tip 84 reaches and is received in the bearing track 56, at which point both the handle 92 and the cam 80 have rotated approximately 90 degrees (see FIG. 10) (this angular change is determined by the shape of the bearing surface 86 and the tip 84). In this position, a slot 85 on the tip 84 of the cam 80 reaches the finger 58, which deflects into the slot 85 and holds the cam 80 in place (FIG. 11). This interaction maintains the head 26 in the raised position, at which point the bowl 30 may be removed, the beaters 28 released for cleaning, etc.

Figure 10:
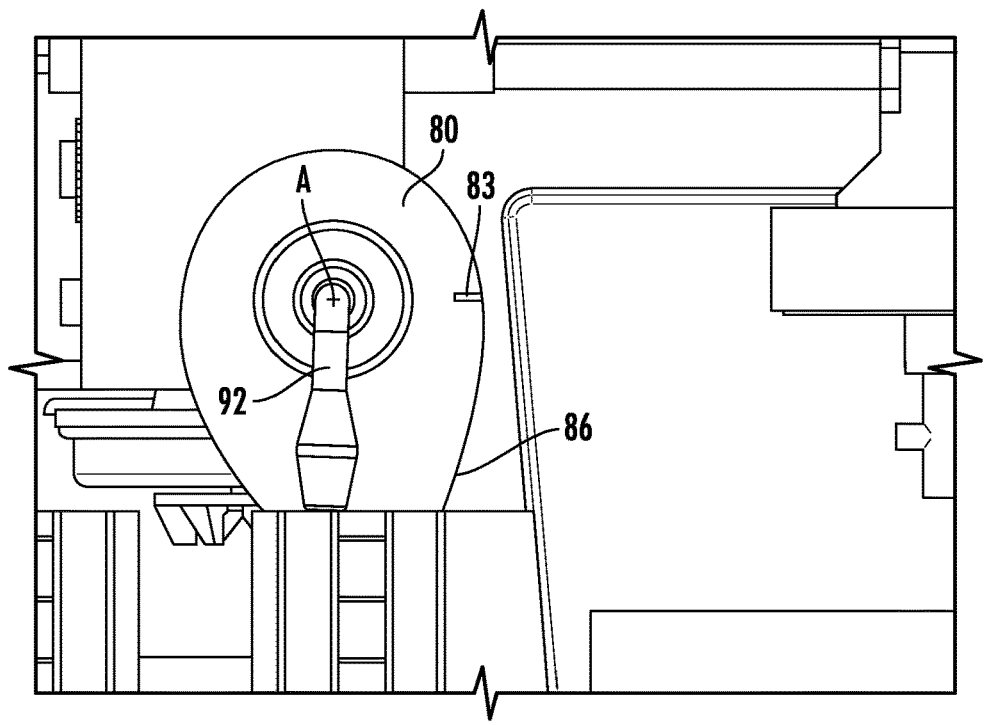
FIG. 10 is a partial internal perspective view of the stand mixer of FIG. 1 showing the interaction of the cam and the bearing track with the head in its raised position.

The head 26 can be returned to the lowered position by simply pivoting the handle 92 in the opposite direction (clockwise from the vantage point of FIG. 10). The remaining components reverse their prior movements and return to their original positions, where they are maintained in place with the finger 58 positioned in the slot 83.

Those skilled in this art will recognize that the stand mixer 20 can take other forms. For example, the head-raising mechanism 78 may be modified. As one example, the handle 92 may be oriented differently (e.g., extending upwardly in the lowered position and horizontally in the raised position). As another example, the cam 80 may be oriented so that the tip 84 extends forwardly, such that the cam 80 is rotated in the opposite direction to lift the upper assembly 21b. As another alternative, the cam 80 may be attached to the lower housing 42, such that an upper bearing surface of the cam 80 and the tip 84 contact a downward-facing bearing surface on the upper housing 60 and raises the upper assembly 21b through contact therewith. As a further alternative, the bearing surface 86 may take a different shape or profile, particularly if it is desired that a rotation angle other than 90 degrees be employed in moving between the raised and lowered positions. Other variations may also be employed.

The mixer 20 may also utilize a different technique for maintaining the upper assembly 21b in the raised or lowered position. For example, rather than being flexible, the finger 58 may be hinged (and in some cases spring-loaded) to deflected into and out of its locking position. Alternatively, the finger 58 may be relatively rigid fit within shallow detents or between nubs on the cam 80. As a different alternative, the bearing track 56 may have a depression that is configured to receive the tip 84 of the cam 80, thereby locking the cam 80 in place in the raised position, and a small projection on the bearing surface 86 of the cam 80 to locking the cam in place in the lowered position. As another alternative, a horizontally-oriented spring-loaded pin may be mounted on the lower assembly 21a that is received in depressions in the side surface of the cam 80 that correspond to the raised and lowered positions to maintain the cam 80 in place.

Also, the lower and upper clutches 46, 64 may be configured differently. For example, they may be friction- or magnetic-based clutches, or may have intermeshing structures that differ from the teeth on the clutches 46, 64 shown therein. Alternatively, a different coupling mechanism (such the hexagonal rod/sleeve configuration described below) may be employed.

Further, different components of the drive train 62 (such as different gear boxes and or planetary gear arrangements may be employed, as may different varieties of beaters. Other variations will be apparent to those of skill in this art.

Figure 14:
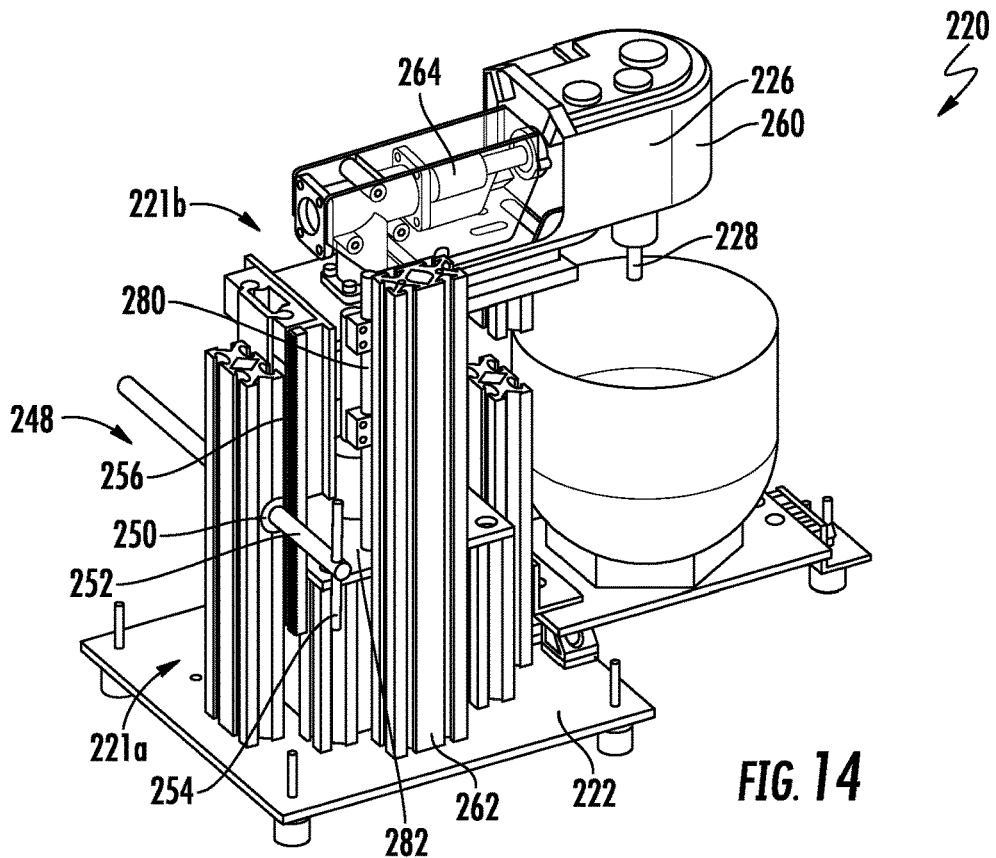
FIG. 14 is a perspective view of a stand mixer according to alternative embodiments of the invention, with the housings removed and the head shown in its raised position.
Figure 15:
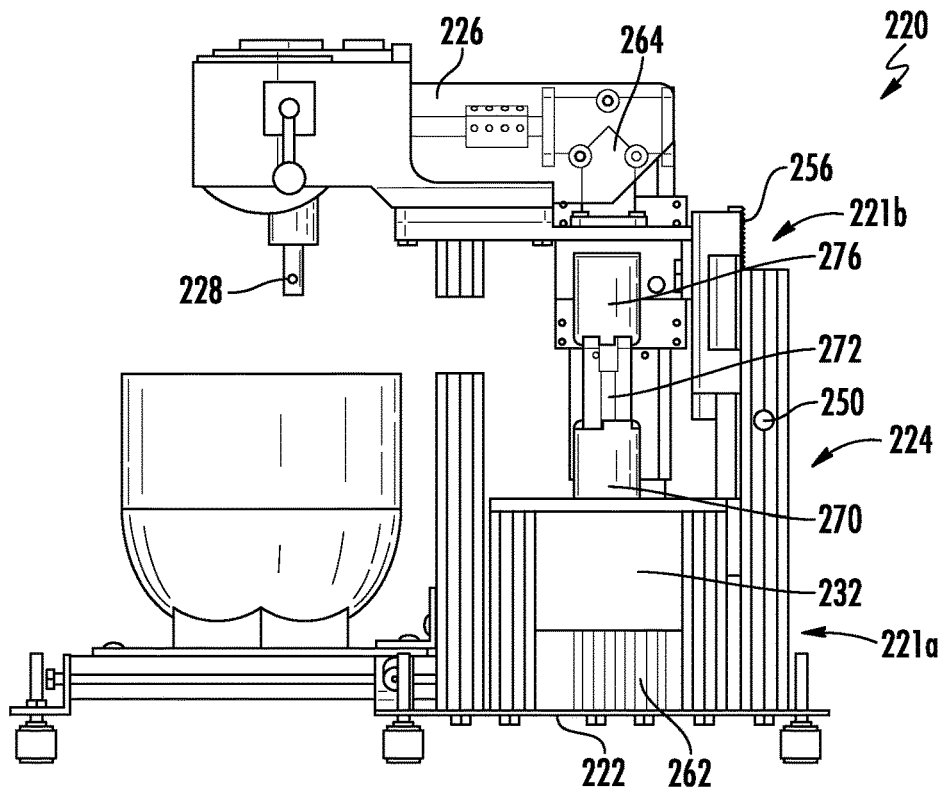
FIG. 15 is a partial side view of the stand mixer of FIG. 14 with the head shown in its raised position.

Referring now to FIGS. 14 and 15, another stand mixer, designated broadly at 220, is shown therein. The stand mixer 220 also has a head-raising mechanism 278 to move the head between raised and lowered positions, but does so via a rack-and-pinion gear system 248 rather than cams. More specifically, similar to the stand mixer 20, the stand mixer 220 includes a lower assembly 221a having a base 222 and a lower housing (not shown) that houses a motor 232. An upper assembly 221b incudes a head 226 and an upper housing 260 (partially shown in FIG. 14) that houses a gearbox 264 and provides a mounting location for beaters 228. A pinion 250 is mounted on an axle 252 that is rotatably mounted to the upper housing. A handle 254 is fixed to one end of the axle 252. A vertical toothed rack 256 is fixed to the floor of the base 222. As can be envisioned from FIG. 14, rotation of the handle 254 rotates the axle 252 and the pinion 250. Teeth on the pinion 250 mesh with teeth on the rack 256 to drive the pinion 250 (and, in turn, the upper assembly 221b) up or down relative to the lower assembly 221a, thereby moving the head 226 and beaters 228 between raised and lowered positions.

FIG. 15 also shows a different mechanism for releasably coupling the motor 232 with the drive train. A rotating hub 270 is mounted to the shaft of the motor 232. The hub 270 has a hexagonal sleeve that extends downwardly from its upper surface (not visible in FIG. 15). A hexagonal rod 272 that is sized to mate with the sleeve of the rotating hub 270 extends downwardly from a rotary hub 276 attached to the gearbox 264.

When the pinion 250 drives the upper support arm assembly 224b to the raised position of FIG. 15, the hexagonal rod 272 is above and completely detached from the sleeve of the rotating hub 270. However, when the pinion 250 drives the upper support arm assembly 224b to the lowered position, the hexagonal rod 272 is inserted into the sleeve of the rotating hub 270 to couple the motor 232 with the gearbox 264. Thus, in this position the motor 232 is coupled with and can drive the beaters 228.

As can also be seen in FIGS. 14 and 15, slides 262 are fixed to the floor 222 of the lower assembly 221a and extend vertically upwardly therefrom. Mating slides (not shown) are present on the interior of the upper housing. Also, vertical rods 280 mounted to the upper assembly 221b extend through holes in a plate 282 fixed to the lower assembly 221a. Thus, as the pinion 250 drives the head 226 vertically, the slides 262 and slides on the upper housing ensure that the movement is substantially vertical and that the upper assembly 221b returns to the proper location for insertion of the rod 272 into the sleeve 270.

Figure 16:
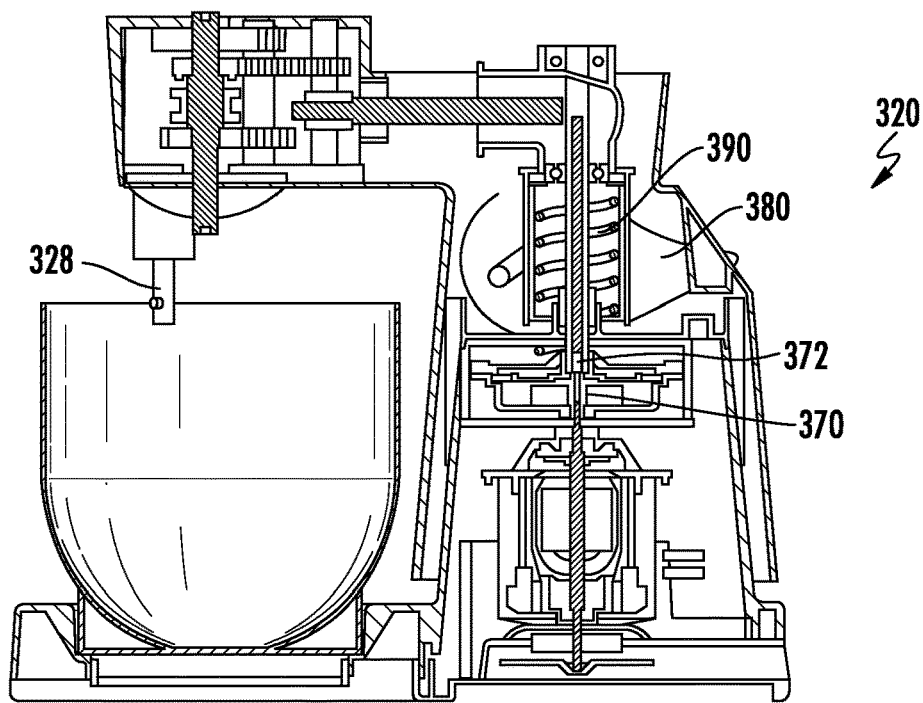
FIG. 16 is a side section view of a stand mixer according to additional embodiments of the invention, with the head shown in a lowered position.
Figure 17:
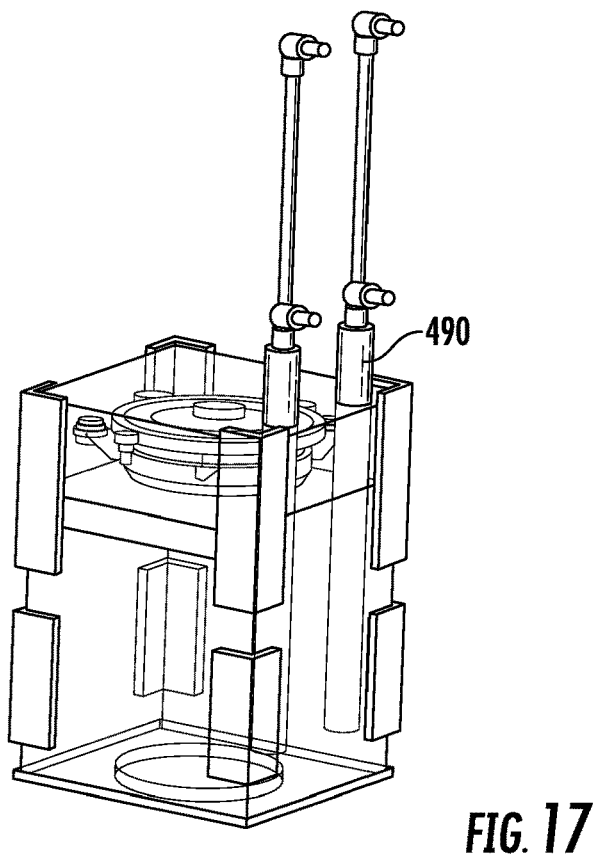
FIG. 17 is a partial rear perspective view of a stand mixer according to further embodiments of the invention.

Another variation of a stand mixer, designated broadly at 320, is shown in FIG. 16. This embodiment employs a cam 380 similar to the cam 80 to lift the upper support arm assembly 324b to the raised position, and employs a hex rod 372 and hex sleeve 370 to couple the motor 332 with the beaters 328. However, lifting of the upper assembly 321b is assisted by a helical spring 390, which is located to encircle a shaft extending upwardly from the hex rod 372. The spring 390 may be desirable if the upper support arm assembly 324b is particularly heavy, as it can provide additional lifting force as the upper support arm assembly 324a is being raised, and can provide a resistive force as the upper support arm assembly 324b is being lowered to prevent it from slamming onto the lower support arm assembly 324a. An alternative lift-assist unit is shown in FIG. 17, in which pneumatic cylinders 490 are mounted to the upper and lower assemblies to provide an assisting force during lifting and a resistive force during lowering.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A stand mixer, comprising:
    a lower assembly comprising a base and a lower support arm assembly extending upwardly from the base;
    an upper assembly comprising a generally horizontal head positioned above the base and an upper support arm assembly extending downwardly from the head, the lower and upper support arm assemblies forming a generally vertical support arm, the head configured to provide a mounting location for a beater;
    a head-raising mechanism that moves the head relative to the base between raised and lowered positions, the head remaining generally horizontal in the raised position; and
    a motor mounted in the lower assembly, a drive train mounted in the upper assembly operatively connected to the beater, a coupling mechanism that couples the drive train to the motor in the lowered position.

2. The stand mixer defined in claim 1, wherein the coupling mechanism comprises a lower clutch mounted to the motor and an upper clutch mounted to the drive train.

3. The stand mixer defined in claim 1, wherein the coupling mechanism comprises a sleeve mounted to one of the lower and upper support arms and a rod configured for insertion into the sleeve mounted to the other of the lower and upper support arms.

4. The stand mixer defined in claim 1, wherein the head-raising mechanism comprises a cam pivotally attached to one of the upper and lower support arm assemblies that bears against the other of the upper and lower support arm assemblies.

5. The stand mixer defined in claim 1, wherein the head-raising mechanism comprising a toothed rack mounted to the lower support arm assembly and a pinion pivotally mounted to the upper support arm assembly that meshes with the toothed rack.

6. The stand mixer defined in claim 1, further comprising a lift-assist unit that assists the upper assembly to move to the raised position.

7. The stand mixer defined in claim 6, wherein the lift-assist mechanism comprises a helical spring.

8. The stand mixer defined in claim 6, wherein the lift-assist mechanism comprises a pneumatic cylinder.

9. A stand mixer, comprising:
    a lower assembly comprising a base, a lower support arm extending upwardly from the base, and a motor;
    an upper assembly comprising a generally horizontal head positioned above the base and an upper support arm extending downwardly from the head, the lower and upper support arm assemblies forming a generally vertical support arm, the head configured to provide a mounting location for a beater;

a drive train mounted in the upper assembly operatively connected to the beater;

a head-raising mechanism that moves the head relative to the base between raised and lowered positions, the head remaining generally horizontal in the raised position; and a coupling mechanism that couples the drive train to the motor in the lowered position and decouples the drive train from the motor in the raised position.

10. The stand mixer defined in claim 9, wherein the coupling mechanism comprises a lower clutch mounted to the motor and an upper clutch mounted to the drive train.

11. The stand mixer defined in claim 9, wherein the coupling mechanism comprises a sleeve mounted to one of the lower and upper support arms and a rod configured for insertion into the sleeve mounted to the other of the lower and upper support arms.

12. The stand mixer defined in claim 9, wherein the head-raising mechanism comprises a cam pivotally attached to one of the upper and lower support arm assemblies that bears against the other of the upper and lower support arm assemblies.

13. The stand mixer defined in claim 9, wherein the head-raising mechanism comprising a toothed rack mounted to the lower support arm assembly and a pinion pivotally mounted to the upper support arm assembly that meshes with the toothed rack.

14. The stand mixer defined in claim 9, further comprising a lift-assist unit that assists the upper assembly to move to the raised position.

15. The stand mixer defined in claim 14, wherein the lift-assist mechanism comprises a helical spring.

16. The stand mixer defined in claim 14, wherein the lift-assist mechanism comprises a pneumatic cylinder.

17. A stand mixer, comprising:

a lower assembly comprising a base, a lower support arm extending upwardly from the base, and a motor;

an upper assembly comprising a generally horizontal head positioned above the base and an upper support arm extending downwardly from the head, the lower and upper support arm assemblies forming a generally vertical support arm, the head configured to provide a mounting location for a beater;

a drive train mounted in the upper assembly operatively connected to the beater;

a head-raising mechanism that moves the head relative to the base between raised and lowered positions, the head remaining generally horizontal in the raised position, the head-raising mechanism comprising a cam pivotally mounted to the upper support arm assembly that bears against the lower support arm assembly; and a coupling mechanism that couples the drive train to the motor in the lowered position and decouples the drive train from the motor in the raised position.

18. The stand mixer defined in claim 17, wherein the coupling mechanism comprises a lower clutch mounted to the motor and an upper clutch mounted to the drive train.

19. The stand mixer defined in claim 17, wherein the coupling mechanism comprises a sleeve mounted to one of the lower and upper support arms and a rod configured for insertion into the sleeve mounted to the other of the lower and upper support arms.

* * * * *